(12) United States Patent
Karaorman

(10) Patent No.: US 7,266,619 B2
(45) Date of Patent: Sep. 4, 2007

(54) FRAMEWORK FOR HIGH-PERFORMANCE HARDWARE ABSTRACTION

(75) Inventor: Murat Karaorman, Santa Barbara, CA (US)

(73) Assignee: Texas Instruments Incorporated, Dallas, TX (US)

( * ) Notice: Subject to any disclaimer, the term of this patent is extended or adjusted under 35 U.S.C. 154(b) by 600 days.

(21) Appl. No.: 10/656,587

(22) Filed: Sep. 5, 2003

(65) Prior Publication Data

US 2004/0078499 A1   Apr. 22, 2004

Related U.S. Application Data

(60) Provisional application No. 60/419,636, filed on Oct. 18, 2002.

(51) Int. Cl.
 *G06F 13/28* (2006.01)
 *G06F 9/44* (2006.01)
(52) U.S. Cl. .......................... 710/22; 719/327; 719/321
(58) Field of Classification Search ................. 710/22; 719/326, 327
See application file for complete search history.

(56) References Cited

U.S. PATENT DOCUMENTS 6,941,390 B2 * 9/2005 Odom .......................... 710/22
6,959,439 B1 * 10/2005 Boike ......................... 719/326
2003/0233487 A1 * 12/2003 Ruget et al. ................. 709/321

OTHER PUBLICATIONS

"Design and Implementation of an eXpressDSP-Compliant DMA Manager for C6XIX", Karaorman et al, Texas Instruments Application Report, Sep. 2002.

* cited by examiner

*Primary Examiner*—Donald Sparks
*Assistant Examiner*—Benjamin Geib
(74) *Attorney, Agent, or Firm*—Robert D. Marshall, Jr.; W. James Brady; Frederick J. Telecky, Jr.

(57) ABSTRACT

In some embodiments, a system comprises a processor that executes an algorithm. Coupled to the processor is memory that stores the algorithm. In addition, the system comprises a hardware unit that is generally not accessible to the algorithm and an abstraction layer that indirectly facilitates interaction between the hardware unit and the algorithm. The hardware unit comprises one or more physical resources, such as data channels, that are associated by the abstraction layer with a logical resource. In addition, the abstraction layer creates an identifier to the logical resource that may be used by the algorithm. Associated with the identifier is a private state that represents the most recently configured settings of the logical resource. A vector table is used in conjugation with the private state to identify memory locations of optimized command functions that carry out operations associated with the hardware unit. In addition, the vector table is adapted to reflect the run-time state of the system.

14 Claims, 3 Drawing Sheets

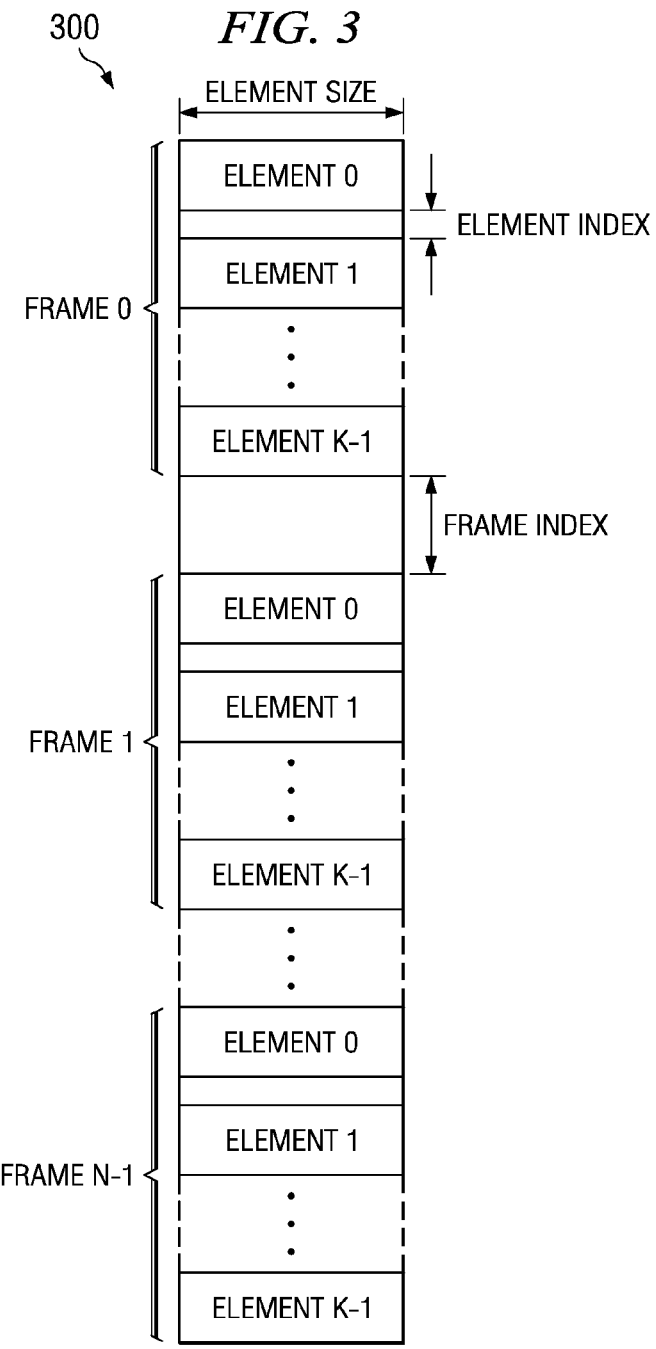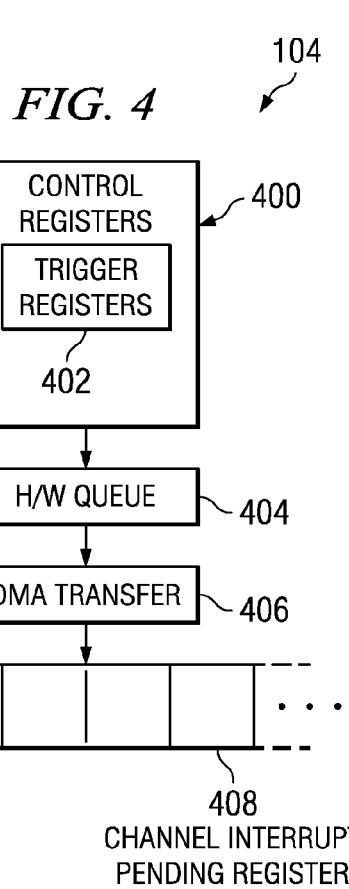

FRAMEWORK FOR HIGH-PERFORMANCE HARDWARE ABSTRACTION

This application claims priority under 35 USC §119(e)(1) of Provisional Application No. 60/419,636, filed Oct. 18, 2002.

CROSS-REFERENCE TO RELATED APPLICATIONS

Not applicable.

BACKGROUND OF THE INVENTION

1. Technical Field of the Invention

The present invention relates generally to accessing hardware and more particularly to optimized techniques for accessing hardware.

2. Background Information

Many types of devices contain hardware that perform specialized functions. Such hardware may include memory controllers and hardware accelerators that increase the execution of functions related to the hardware. Typically, programs that operate on a device may not directly access the hardware. Instead, an abstraction layer that may access the hardware is created. The abstraction layer comprises software that facilitates the communication between the hardware and the programs. In addition, the abstraction layer allows the programs to indirectly use the specialized functions associated with the hardware. However, the abstraction layer may undesirably introduce latency into the system. In addition, the abstraction layer may be incompatible with various hardware configurations.

BRIEF SUMMARY

In some embodiments, a system comprises a processor that executes an algorithm. Coupled to the processor is memory that stores the algorithm. In addition, the system comprises a hardware unit that is generally not accessible to the algorithm and an abstraction layer that indirectly facilitates interaction between the hardware unit and the algorithm. The hardware unit comprises one or more physical resources, such as data channels, that are associated by the abstraction layer with a logical resource. In addition, the abstraction layer creates an identifier to the logical resource that may be used by the algorithm. Associated with the identifier is a private state that represents the most recently configured settings of the logical resource. A vector table is used in conjugation with the private state to identify memory locations of optimized command functions that carry out operations associated with the hardware unit. In addition, the vector table is adapted to reflect the run-time state of the system.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein:

FIG. 3 illustrates a direct memory access transfer block in accordance with preferred embodiments of the invention;

FIG. 4 illustrates a block diagram of the direct memory access controller in accordance with preferred embodiments of the invention;

DETAILED DESCRIPTION OF THE PREFERRED EMBODIMENTS

Figure 1:
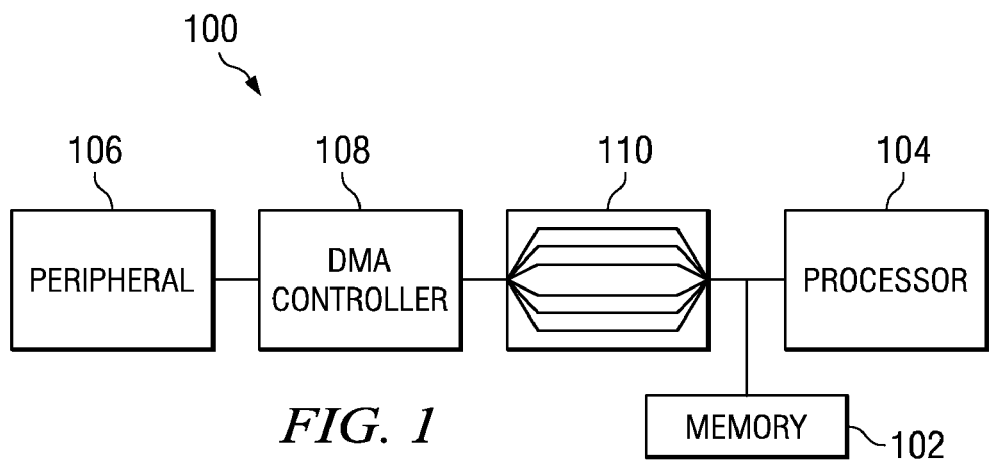
FIG. 1 shows a diagram of a system in accordance with preferred embodiments of the invention and including a direct memory access controller.

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a digital signal processing (DSP) system that includes a microprocessor. Merely by way of example, the embodiments described herein are directed to an eXpressDSP system that supports a direct memory access (DMA) mechanism for transferring data. In addition, the algorithms that operate on the eXpressDSP system are compliant with the eXpressDSP Algorithm Interoperability Standard (XDAIS). A set of programming techniques may be used as a framework for achieving a high-performance abstraction layer between the XDAIS algorithms that operate on the system and the DMA hardware coupled to the system. A discussion of the XDAIS follows the discussion of DMA below.

DMA is a transfer mechanism that allows data to be transferred between memory regions coupled to a system without intervention by a microprocessor. The memory regions may include internal memory regions coupled to a processor and memory regions coupled to an internal or external peripheral. For example, an external peripheral, such as an external disk drive, may use DMA transfers to move data from the cache memory region of the disk drive to the internal memory region of a system coupled to the disk drive.

Associated with the DMA mechanism is a variety of hardware. One such piece of hardware, referred to as a "DMA controller", may schedule and facilitate DMA transfers between memory regions. The DMA controller has a predefined transfer bandwidth that is divided into "physical channels" between the memory regions. In addition, the DMA controller transfers data through the physical channels in a format referred to as a "transfer block". Typically, a DMA controller may support 1 to 16 physical channels and various different configurations of transfer blocks. Other hardware, such as control registers, may also be coupled, or otherwise accessible, to the DMA controller for storing control information defining a particular DMA transfer.

The various XDAIS algorithms that are used to transfer data through the DMA mechanism are unable to interact directly with the DMA controller and associated hardware. This inability is a limitation of the XDAIS to ensure that algorithms are interoperable and reusable on systems with different hardware configurations. For example, two systems each may have a DMA controller that supports 8 and 16 physical channels, respectively. An algorithm that is created on the second system and that uses all of the 16 physical channels may not be interoperable and reusable on the first system. To ensure XDAIS algorithms are interoperable and reusable, XDAIS algorithms are not permitted to directly interact with the DMA controller and associated hardware. However the algorithms may interact with an abstraction layer, referred to as a "client program," that facilitates DMA transfers for the algorithms.

Three programming interfaces preferably facilitate the interaction between an XDAIS algorithm and a client program responsible for interacting with a DMA controller. The first interface is referred to as the "algorithm standard interface" and this interface is responsible for instantiating all XDAIS algorithms. In addition, the algorithm standard interface manages the memory associated with an XDAIS algorithm. The second and third programming interfaces, referred to as the "DMA interface" and the "asynchronous copy interface", allow an XDAIS algorithm to negotiate with a client program to configure and schedule a DMA transfer. Additional information regarding the eXpressDSP-complaint systems and the XDAIS may be found at Referring now to FIG. 1, a system 100 is shown in accordance with a preferred embodiment of the invention. As shown, the system 100 includes a memory unit 102 for storing data and a processor 104 for executing applications. In addition, system 100 includes a peripheral 106 coupled to a DMA controller 108. The peripheral 106 may transfer data to the memory 102 through, or otherwise by the action of, the DMA controller 108. In addition, data may be transferred from the memory 102 to the peripheral 106 though the DMA controller 108. The peripheral 106 may include a hard drive, a tape backup, or other hardware unit that supports DMA transfers.

In accordance with the preferred embodiments, all DMA transfers in system 100 preferably use a "logical channel" to transfer data. A logical channel is a logical representation of a physical channel associated with the DMA controller 108. Although the DMA controller may support any number of physical DMA channels, in at least one embodiment the DMA controller 108 may support 8 physical channels 110 to the memory 102 as shown. Each physical channel preferably has a one-to-one correspondence with a logical channel. Thus, 8 logical channels may exist in the system 100.

Figure 2:
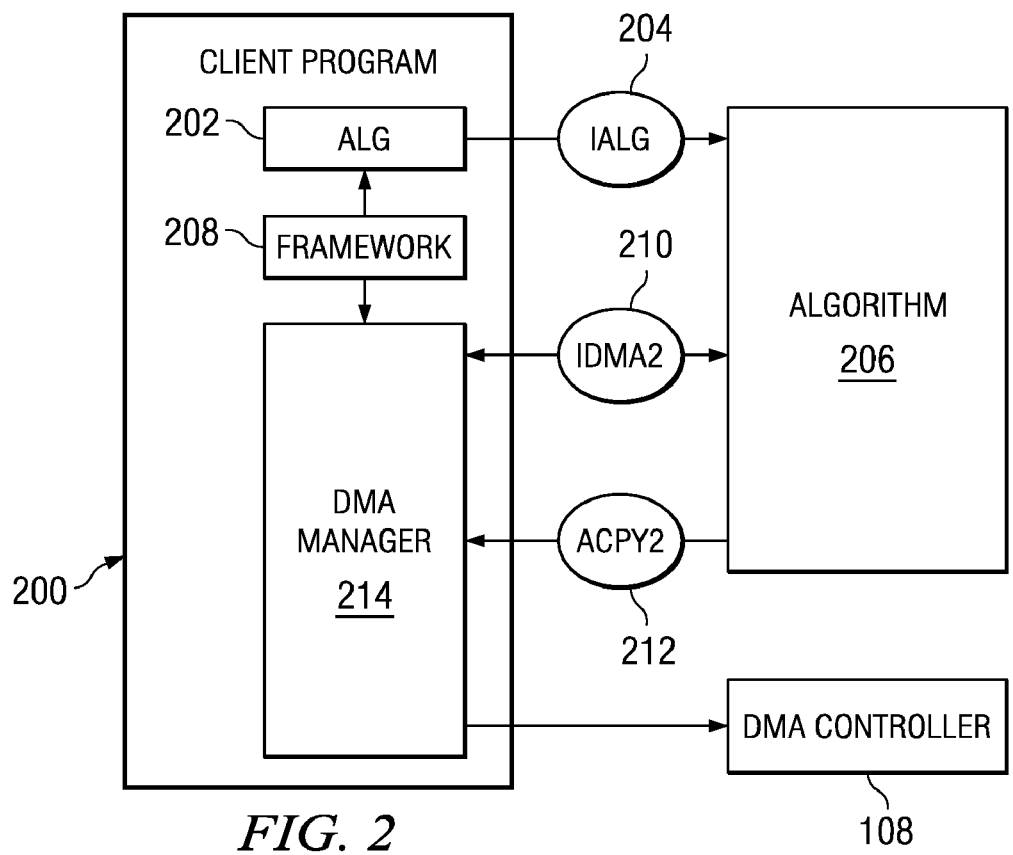
FIG. 2 illustrates a set of program interfaces in accordance with preferred embodiments of the invention.

Referring now to FIG. 2, the standard interfaces that preferably support the DMA mechanism are shown. As previously mentioned, the client program 200 may act as an abstraction layer between instantiated algorithm 206 and the DMA controller 108. The client program 200 preferably instantiates an algorithm (ALG) 202 through the algorithm standard interface (IALG) 204 that results in an instantiated algorithm 206. In addition, a set of initialization procedures and data structures, referred to as the "XDAIS framework" 208, may be included in the client program 200. The XDAIS framework 208 preferably manages memory usage for the instantiated algorithm 206.

In accordance with the preferred embodiments, the client program 200 and the instantiated algorithm 206 may use the DMA interface (IDMA2) 210 and asynchronous copy interface (ACPY2) 212 to facilitate DMA operations, such as the requesting of DMA channels and the scheduling of DMA transfers. Each interface, the algorithm standard interface 204, the DMA interface 210, and the asynchronous copy interface 212, may include associated functions (not specifically shown) that may be executed by the algorithm 206 and the client application 200 to carry out a function associated with the DMA mechanism. A DMA manager 214 preferably interacts with the DMA hardware, such as the DMA controller 108, and the instantiated algorithm 206 to identify physical channels and associate a physical channel with a logical channel.

To perform a DMA transfer, the instantiated algorithm 206 preferably requests a logical channel from the DMA manager 214 through the DMA interface 210. The DMA manager 214 may receive the request and identify a suitable physical channel for the DMA transfer by interacting with the DMA controller 108. After identification of a physical channel, the DMA manager 214 preferably grants a "handle" to the identified logical channel. The instantiated algorithm 206 receives the handle and may schedule a transfer using the handle. The handle may comprise a pointer to the logical channel that uniquely identifies the logical channel for the instantiated algorithm 206.

Associated with each handle, a data structure referred to as the "private channel state" preferably identifies the type of transfer that most recently used the logical channel. An exemplary list of the fields associated with the private channel state of a DMA channel is shown in Table 1 below. The private channel state preferably is stored in non-volatile cache memory that is accessible by the client program 200 and the instantiated algorithm 206. The non-volatile cache memory may or may not be coupled to the memory 102. The private channel state defines the characteristics of the DMA transfer that most recently used the associated logical channel. For example, if a logical channel performed a one-dimensional to one-dimensional (1D-to-1D) 16-bit transfer, the handle associated with this logical channel may have an associated private channel state with the corresponding values for a 1D-to-1D 16-bit transfer type.

TABLE 1

Private Channel State Configurations

| Field | Possible Values |
|---|---|
| Transfer Type | 1D-to-1D, 1D-to-2D, 2D-to-1D, or 2D-to-2D |
| Element Size | 1, 2, or 4 bytes |
| Number of Frames | 1-65535 |
| Source Element Index | −32765-+32765 |
| Destination Element Index | −32765-+32765 |
| Source Frame Index | −32765-+32765 |
| Destination Frame index | −32765-+32765 |
| Number of Elements | Configurable |
| Destination Address | 8-bit byte address of destination memory region |
| Source Address | 8-bit byte address of source memory region |

Referring now to FIG. 3, an exemplary DMA transfer block 300 is shown in accordance with the preferred embodiment. All DMA transfers preferably are partitioned into transfer blocks based upon the private channel state configuration as shown. Block 300 shows N frames, each comprising K elements. The gap between frames may be referred to as the "frame index," and the gap between elements may be referred to as the "element index." The private state configuration associated with a logical channel exactly determines the formation of the transfer block 300 that is transferred through the DMA channel.

Referring to FIG. 4, a diagram of an exemplary DMA mechanism is shown. To schedule a DMA transfer, a set of control registers 400 accessible to the DMA controller 108 preferably are written to by the DMA manager 214 (FIG. 2). Within the control registers 400 exist one or more trigger registers 402 that trigger the DMA controller 108 to place the transfer into a hardware queue 404. The transfer preferably is placed into a hardware queue 404 after a trigger register 402 is written to by the DMA manager 214. While in the queue 404, the transfer waits, if necessary, until the physical channel associated with the transfer becomes available. Once the physical channel is available, the DMA transfer 406 may be performed. After the DMA transfer 406 completes, a bit in a channel interrupt pending register 408 is set to indicate the completion of the transfer. A new transfer may now occupy the physical channel associated with the completed transfer. The number of registers in the control registers 400 and the triggering registers 402 may vary depending on the specific DMA implementation. For example, the C6x1x family of DSP systems include four general registers and the MegaStar3 DSP system includes 14 general registers. Typically, at least a source and destination memory address, as well as a count value indicating the number of elements in each frame of the transfer blocks, is included in the control register 400.

In accordance with the preferred embodiments, the client program 200 and the instantiated algorithm 206 may interact through three types of functions. As previously discussed, the functions preferably are included in the algorithm interface 204, the DMA interface 210, and the asynchronous copy interface 212. The first type of functions may configure the private channel state of a logical channel and may be referred to as "configuration functions." The configuration functions preferably configure, if necessary, the logical channels that may be used by the algorithm 206. More specifically, the configuration functions may pre-compute all possible private channel state combination and control register 400 settings associated with all DMA transfers in the instantiated algorithm 206. These values may be cached to the private channel state associated with a handle and to the control registers 400. When the instantiated algorithm 206 requests a handle to a logical channel, the DMA manager 214 preferably returns a logical handle that has a private state compatible with the expected transfer type (e.g., 1D-to-2D 8-bit). Thus, the configure functions may be optimally used only once to configure the logical channels that the algorithm 206 may use to transfer data.

The second type of functions may control the operations performed on a logical channel and may be referred to as "command functions." The command functions preferably request and grant a logical channel to the algorithm 206. Lastly, the third type of functions may synchronize a scheduled transfer and may be referred to as "synchronization functions." The synchronization functions preferably synchronize data with scheduled transfers, which may have blocking and non-blocking characteristics.

When the instantiated algorithm 206 desires to transfer data using the DMA mechanism, a generic command function included in the asynchronous copy 212 interface preferably is called by the instantiated algorithm 206. A exemplary generic command function, ACPY2_start( ), is shown below in pseudo code:

```
ACPY2_start(hdl, src0, dst0, xferSize0)
{
    transferType = hdl->configId
    branch to ACPY2_Fxns[transfertype]
}
``` where the Hdl argument may represent a handle identifier; the src0 is the source memory region to transfer data from; the dst0 is the destination memory region to transfer data to; and the xferSize0 is the transfer size of the upcoming transfer in bytes. The generic command function preferably is written in a low-level programming language, such as assembly. Within the generic command function, the transfer type of the requested transfer is determined by examining the configId associated with handle identifier. The most recently issued "configuration function" on this channel sets the configID to the proper value that identifies the correct function in the function table. After the transfer type is identified, an assembly branch operation preferably executes an "optimal command function". The optimal command function is a command function within the asynchronous copy interface 212 that is designed for the particular transfer type. For example, if the transferType represents a one-dimensional to two-dimensional (1D-to-2D) 16-bit transfer, the optimal command function preferably is designed for a 1D-to-2D 16-bit transfer. In order to ensure that an assembly branch can be performed, the command function signatures (i.e., return type and the types of the arguments passed to the function) and number and types of any automatically allocated variables in the command functions are identical. An exemplary optimal command function, ACPY2_start1d2d16b( ), corresponding to an optimized implementation of the command function that the above ACPY2_start( ) function may branch to when the transfer type is 1D-to-2D 16-bit is shown below in pseudo code:

```
ACPY2_start1d2d16b(hdl, src, dst, size)
{
    <Configure physical channel hdl->physChan
    for 1d2d16b type transfer type>
    <Optimize ACPY_Fxns for this transfer type>
    1. Revert all sharing this Phys channel to
    nonOPTIMAL start functions.
    2. ACPY2_Fxns[hdl->i] = &ACPY2_start1d2d16bOPT
    branch to ACPY2_Fxns[hdl->i]
}
``` where the hdl argument may represent a handle identifier; the src is the source memory region to transfer data from; the dst is the destination memory region to transfer data to; the size is the transfer size of the upcoming transfer in bytes; and the &ACPY2_start1d2d16bOPT is the memory address of the optimized command function for 1D-to-2D 16 bit transfers.

Numerous optimal functions preferably exist in the asynchronous copy interface 212 for carrying out various transfer types. For example, a first function may be designed to handle 1D-to-2D 8-bit transfers and a second function may be designed to handle two-dimensional to two-dimensional (2D-to-2D) 8-bit transfers. The preferred process to determine the memory location of the optimal command function uses a vector table as described below.

Figure 5:
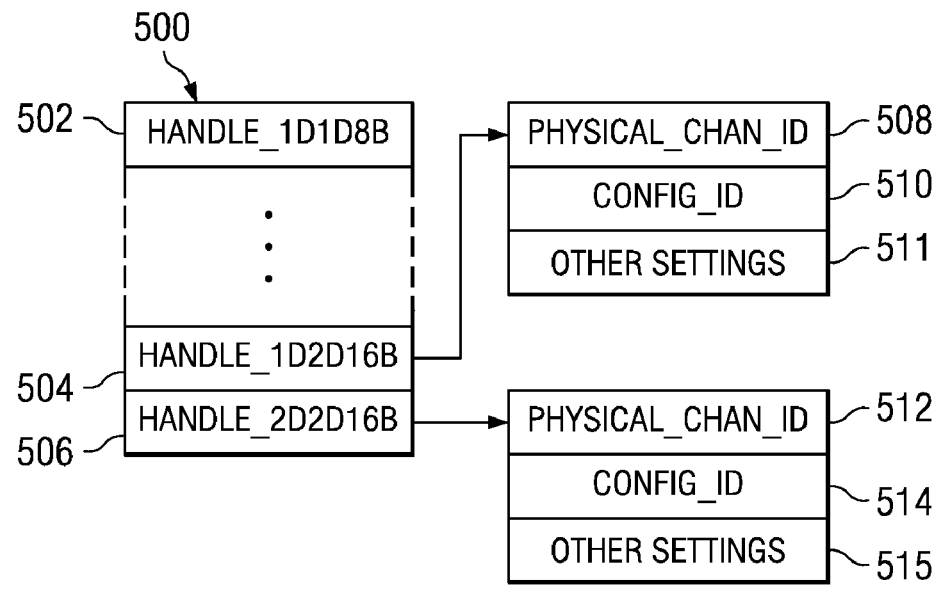
FIG. 5 shows a data structure associated with a first optimization in accordance with preferred embodiments of the invention.
Figure 6:
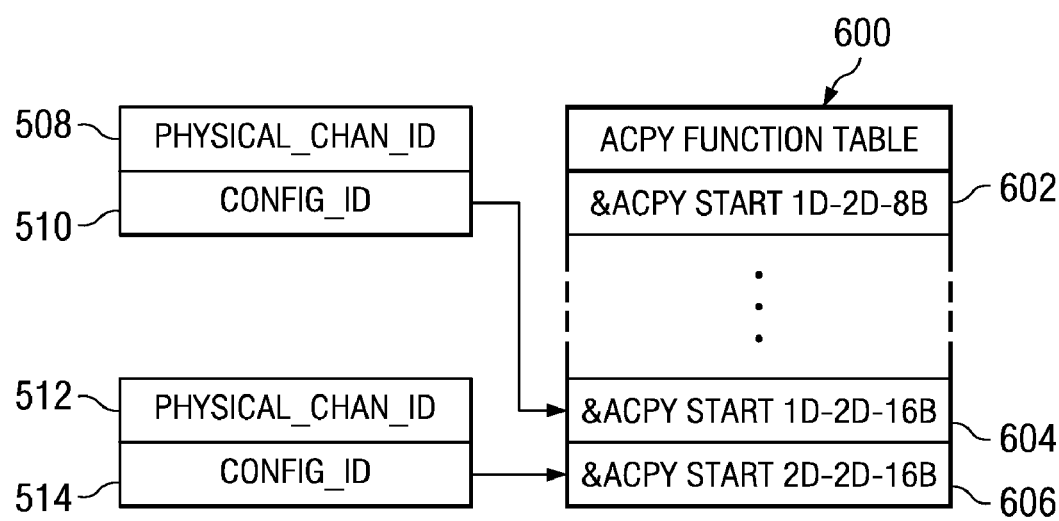
FIG. 6 shows a data structure associated with a second optimization in accordance with preferred embodiments of the invention.

Referring to FIGS. 5 and 6, an exemplary vector table is shown in accordance with the preferred embodiments. The vector table comprises a handle table 500 that preferably contains the logical handles requested by the instantiated algorithm 206. Although any number of handles may exist, three such handles 502, 504, and 506 are shown to facilitate discussion. The first handle 502 may represent a logical channel configured for a 1D-to-1D 8-bit transfer, whereas the second handle 504 and the third handle 506 may represent a logical channel configured for a 1D-to-2D 16-bit and a 2D-2D 16-bit transfer, respectively. A pointer may associate the handle 504 and the handle 506 with the physical channel identifiers 508 and 512 (physical_chan_id) and other configuration setting 511 and 515 respectively. The physical channel identifiers 508 and 512 may uniquely identify a physical channel supported by the DMA controller 108. Associated to the physical channel identifiers 508 and 514 are the configuration identifiers 510 and 514 (config_id), respectively. The configuration identifiers 510 and 514 are used to directly determine (i.e., without a search) the location of the optimal command function. In addition, the configuration identifiers 510 and 514 may represent a specific transfer type, as previously discussed. The handle table 500 and the associated physical channel and configuration identifiers preferably are stored in non-volatile memory coupled to the DMA manager 214.

Referring now to FIG. 6, the configuration identifiers 510 and 514 may reference an entry in a function table 600 that contains the memory location of an optimized command function for a particular transfer type. For example, the configuration identifier 510 may reference the memory location of an optimized command function included within the asynchronous copy interface 212. This optimized function 604 may be designed for 1D-to-2D 16-bit transfers. Accordingly, configuration identifier 514 may reference the memory location of an optimized command function 606 that is designed for 2D-to-2D 16-bit transfers. This memory location is used by the branch operation in the generic command function to execute the optimal command function for a given transfer type, as previously discussed. The DMA manager 214 preferably is responsible for ensuring that the vector table references the proper optimal command functions.

In addition, the DMA manager 214 may assign a "super-optimal command function" in the function table 600. The super-optimal variant function is an enhanced version of the optimal command function. More specifically, the super-optimal command function may identify values previously written to the control registers 400 by an optimal command function that are identical to an upcoming DMA transfer. Since all identical values are properly assigned, these values are not re-written by the super-optimal command function. For example, the element size of a transfer may be identical to a previous transfer that used the same logical channel. Thus, the element size register in the command registers 400 may not need to be written to by a super optimal command function, thereby increasing the performance of the super optimal command function. A exemplary super-optimal command function, ACPY2_start1d2d16bOPT( ) (in pseudo code), corresponding to an optimized implementation of the command that the ACPY2_start( ) function branches to when the transfer is a 1D-to-2D transfer with 16bit element size and the most recently issued transfer was also of the same transfer type is shown below in pseudo code:

```
ACPY2_start1d2d16bOPT(hdl, src, dst, size)
{
    Set source & destination regs
    Set size reg
    Start DMA
}
```

Numerous variations and modifications will become apparent to those skilled in the art once the above disclosure is fully appreciated. It is intended that the following claims be interpreted to embrace all such variations and modifications.

What is claimed is:

1. A system, comprising:
a processor that executes an algorithm;
a hardware unit that comprises one or more physical resources; and
an abstraction layer implemented by said processor that facilitates communication between the algorithm and the hardware unit through the use of a plurality of functions and that creates a reference to a logical resource that is associated with a corresponding physical resource, the plurality of functions comprise command functions that request and grant an identifier to the algorithm including a command function that branches to a function that is optimized for configured settings of the logical resource based upon a vector table that associates the reference to a logical resource with a memory location of the function that is optimized, and
wherein each logical resource is associated with at least one private state that represents most recently configured settings of the logical resource.

2. The system of claim 1 wherein the reference comprises a pointer to the logical resource.

3. The system of claim 1 wherein the plurality of functions are selected from the group consisting of command functions that request and grant the identifier to the algorithm, configuration functions that pre-compute and store register values and algorithm settings, synchronization functions that align the logical resource with the physical resource, and a combination thereof.

4. The system of claim 1 wherein the command functions comprise a function that monitors the physical resources and updates a corresponding vector table that associates the reference to a logical resource with a memory location of function optimized for a current operation.

5. The system of claim 1 wherein the command functions comprise a function that does not write to a register associated with the physical resource if a previous use of the physical resource has left the register in a state compatible with a current operation.

6. The system of claim 1 wherein the function that branches and the function that is optimized for the configured settings comprise functions with identical function signatures.

7. A system, comprising:
a processor that executes an algorithm;
a hardware unit that comprises one or more physical resources;
an abstraction layer implemented by said processor that facilitates communication between the algorithm and the hardware unit through the use of a plurality of functions and that creates a reference to a logical resource that is associated with a corresponding physical resource, wherein the plurality of functions are selected from the group comprising configuration functions that pre-compute and store register values and system state settings, and wherein the configuration functions comprise a function that selects and stores an address of a function that is optimized for a current operation; and wherein each logical resource is associated with at least one private state that represents most recently configured settings of the logical resource.

8. A method for achieving hardware abstraction, comprising:
creating a reference to a logical resource that is associated with a corresponding physical resource;
associating with the logical resource one or more private states that represents most recently configured settings of the logical resource; and
executing a plurality of functions that facilitate communication between the physical resource and an algorithm, wherein the plurality of functions comprise command functions that request and grant an identifier to the algorithm including a function that branches to a function that is optimized for the configured settings based upon a vector table that associates the reference to a logical resource with a memory location of the function that is optimized.

9. The method of claim 8 wherein the reference comprises a pointer to the logical resource.

10. The method of claim 8 wherein the plurality of functions are selected from the group consisting of command functions that request and grant an identifier to the algorithm, configuration functions that pre-compute and store register values and algorithm settings, synchronization functions that align the logical resource with the physical resource, and a combination thereof.

11. The method of claim 8 wherein the command functions comprise a function that monitors the physical resources and updates a corresponding vector table that associates the reference to a logical resource with a memory location of function optimized for a current operation.

12. The method of claim 8 wherein the command functions comprise a function that does not write to a register associated with the physical resource if a previous use of the physical resource has left the register in a state compatible with a current operation.

13. The method of claim 8 wherein the function that branches and the function that is optimized for the configured settings comprise functions with identical function signatures.

14. A method for achieving hardware abstraction, comprising:
creating a reference to a logical resource that is associated with a corresponding physical resource;
associating with the logical resource one or more private states that represents most recently configured settings of the logical resource; and
executing a plurality of functions that facilitate communication between the physical resource and an algorithm, wherein the plurality of functions comprises configuration functions that pre-compute and store register values and algorithm settings and wherein the configuration functions comprise a function that selects and stores an address of a function that is optimized for a current operation.

* * * * *